(12) United States Patent
King

(10) Patent No.: US 8,313,133 B2
(45) Date of Patent: Nov. 20, 2012

(54) VEHICULAR UTILITY BED HAVING LOCKING ASSEMBLY AND VEHICLES INCLUDING SAME

(75) Inventor: Darin D. King, Raymond, OH (US)

(73) Assignee: Honda Motor Company, Ltd., Tokyo (JP)

( * ) Notice: Subject to any disclaimer, the term of this patent is extended or adjusted under 35 U.S.C. 154(b) by 321 days.

(21) Appl. No.: 12/697,421

(22) Filed: Feb. 1, 2010

(65) Prior Publication Data

US 2011/0187178 A1 Aug. 4, 2011

(51) Int. Cl.
*B60J 7/00* (2006.01)
(52) U.S. Cl. ...... 296/69; 296/66; 296/65.16; 296/186.4; 296/183.2
(58) Field of Classification Search ............... 296/63, 296/69, 66, 65.16, 183.2, 184.1, 14, 26.11, 296/186.4; 297/378.12
See application file for complete search history.

(56) References Cited

U.S. PATENT DOCUMENTS

| | | | |
|---|---|---|---|
| 4,019,781 A * | 4/1977 | Ray | 298/22 J |
| 4,480,868 A | 11/1984 | Koto | |
| 4,861,096 A | 8/1989 | Hastings | |
| 5,934,727 A | 8/1999 | Storc et al. | |
| 5,979,964 A | 11/1999 | Ban et al. | |
| 6,237,981 B1 | 5/2001 | Selleck | |
| 6,416,104 B1 | 7/2002 | Fisher et al. | |
| 6,460,915 B1 | 10/2002 | Bedi et al. | |
| 6,481,772 B1 | 11/2002 | Tenn | |
| 6,557,882 B2 | 5/2003 | Harrington | |
| 6,644,709 B2 | 11/2003 | Inagaki et al. | |
| 6,705,680 B2 | 3/2004 | Bombardier | |
| D498,435 S | 11/2004 | Saito et al. | |
| 6,994,388 B2 | 2/2006 | Saito et al. | |
| 7,021,689 B1 * | 4/2006 | Weisbeck, III | 296/26.11 |
| 7,416,238 B2 | 8/2008 | Houston | |
| 7,735,896 B2 | 6/2010 | Kubota | |
| 8,002,331 B2 * | 8/2011 | Bowers | 296/183.2 |
| 2005/0264048 A1 | 12/2005 | Collins | |
| 2008/0309112 A1 | 12/2008 | Duller | |
| 2009/0127886 A1 | 5/2009 | Stortzum | |
| 2009/0195049 A1 | 8/2009 | Shimamura et al. | |
| 2009/0256388 A1 | 10/2009 | Tanaka et al. | |

OTHER PUBLICATIONS

Black, Melissa Ann, Final Office Action, Notification Date of Jul. 21, 2011; U.S. Appl. No. 12/477,717; Titled: Vehicle Having Utility Bed and Seat; filed Jun. 3, 2009; Inventor: David W. Arnold.
U.S. Appl. No. 12/646,160; Titled: Vehicle Having Utility Bed and Passenger Restraint Assembly; filed Dec. 23, 2009; Inventors: David W. Arnold et al.
Black, Melissa Ann, Non-Final Office Action; Notification Date of Feb. 3, 2011; U.S. Appl. No. 12/477,717; Titled: Vehicle Having Utility Bed and Seat; filed Jun. 3, 2009; Inventor: David W. Arnold.

* cited by examiner

*Primary Examiner* — Joseph Pape
(74) *Attorney, Agent, or Firm* — Ulmer & Berne LLP

(57) ABSTRACT

A utility bed includes a bed frame, a bed floor, a sidewall, and a locking mechanism. The bed floor is pivotally coupled with the bed frame and is pivotable between an upright position and a cargo support position. The sidewall comprises a door portion and a wall portion. The door portion is pivotally coupled with the bed floor and pivotable between a closed position and an opened position. The locking mechanism is associated with the sidewall. The locking mechanism is configured to retain the bed floor in the upright position with the door portion of the sidewall in the opened position. Vehicles including a utility bed are also provided.

18 Claims, 10 Drawing Sheets

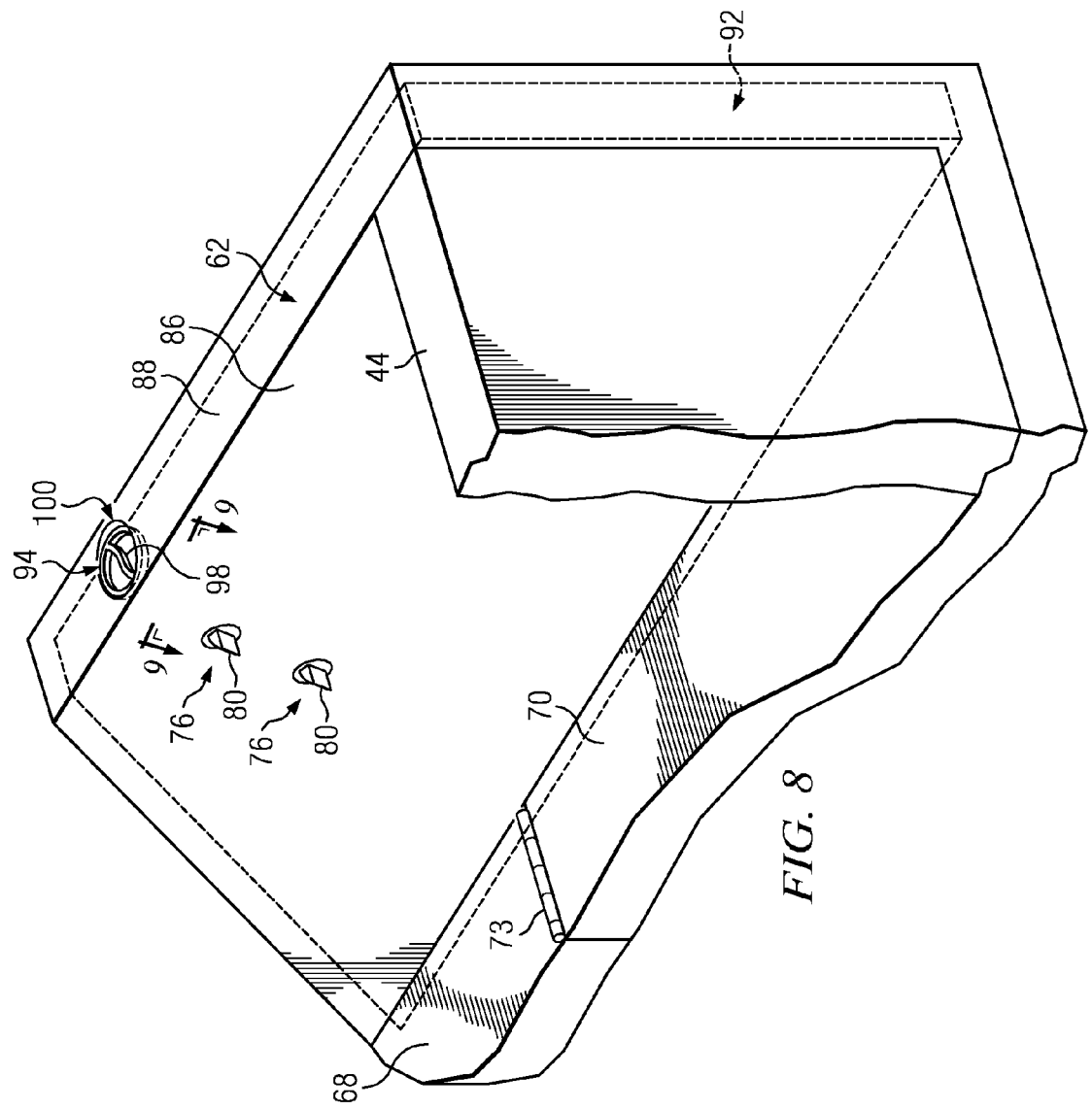
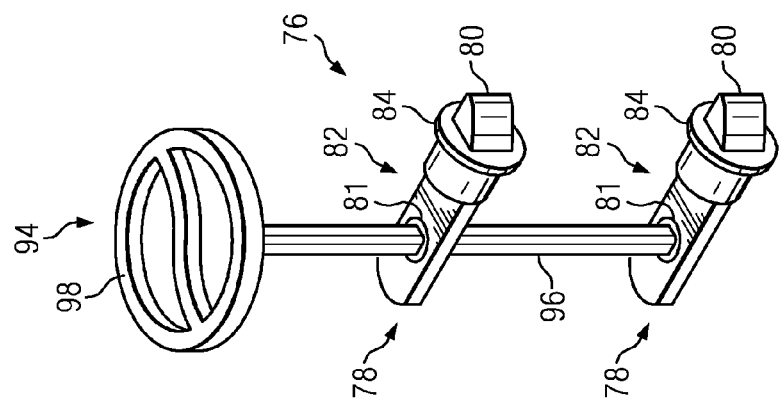
FIG. 8
FIG. 7

VEHICULAR UTILITY BED HAVING LOCKING ASSEMBLY AND VEHICLES INCLUDING SAME

TECHNICAL FIELD

A vehicle includes a utility bed. The utility bed includes a locking mechanism associated with a sidewall.

BACKGROUND

Certain conventional vehicles include a utility bed that includes a sidewall and a bed floor. The bed floor and the sidewall can cooperate to facilitate retention of cargo in the utility bed for hauling by the vehicle.

SUMMARY

In accordance with one embodiment, a utility bed comprises a bed frame, a bed floor, a sidewall, and a locking mechanism. The bed floor is pivotally coupled with the bed frame and is pivotable between an upright position and a cargo support position. The sidewall comprises a door portion and a wall portion. The door portion is pivotally coupled with the bed floor and is pivotable between a closed position and an opened position. The locking mechanism is associated with the sidewall. The locking mechanism is configured to retain the bed floor in the upright position with the door portion of the sidewall in the opened position.

In accordance with another embodiment, a utility bed comprises a bed frame, a bed floor, a left sidewall, a right sidewall, a left locking mechanism, a right locking mechanism, an end wall, a seat back, and a seat bottom. The bed floor comprises a first floor portion and a second floor portion. The first floor portion is pivotally coupled with the bed frame and is pivotable between an upright position and a cargo support position. The left sidewall comprises a left door portion that is pivotable between an opened position and a closed position. The right sidewall comprises a right door portion that is pivotable between an opened position and a closed position. The left locking mechanism is associated with the left sidewall. The right locking mechanism is associated with the right sidewall. The end wall is pivotally coupled with the bed frame and is pivotable between an erect position and a collapsed position. The seat back is coupled with the first floor portion of the bed floor. The seat bottom is coupled with the end wall. When the left door portion and the right door portion are in respective opened positions, the left locking mechanism and the right locking mechanism are configured to selectively respectively engage the left door portion and the right door portion to retain the first floor portion of the bed floor in the upright position.

In accordance with yet another embodiment, a vehicle comprises a vehicular frame and a utility bed. The utility bed comprises a bed frame, a bed floor, a left sidewall, a right sidewall, a left locking mechanism, and a right locking mechanism. The bed floor is pivotally coupled with the bed frame and is pivotable between an upright position and a cargo support position. The left sidewall comprises a left door portion that is pivotable between an opened position and a closed position. The right sidewall comprises a right door portion that is pivotable between an opened position and a closed position. The left locking mechanism is associated with the left sidewall. The right locking mechanism is associated with the right sidewall. When the left door portion and the right door portion are in respective opened positions, the left locking mechanism and the right locking mechanism are configured to cooperate with each other to selectively retain the bed floor in the upright position.

BRIEF DESCRIPTION OF THE DRAWINGS

While the specification concludes with claims particularly pointing out and distinctly claiming the invention, it is believed that the same will be better understood from the following description taken in conjunction with the accompanying drawings in which:

FIG. 7 is a perspective view depicting a right locking mechanism of the utility bed of FIG. 3;

FIG. 8 is left rear perspective view of the right locking mechanism of FIG. 7 associated with a right rear sidewall portion of the right sidewall;

DETAILED DESCRIPTION

Figure 1:
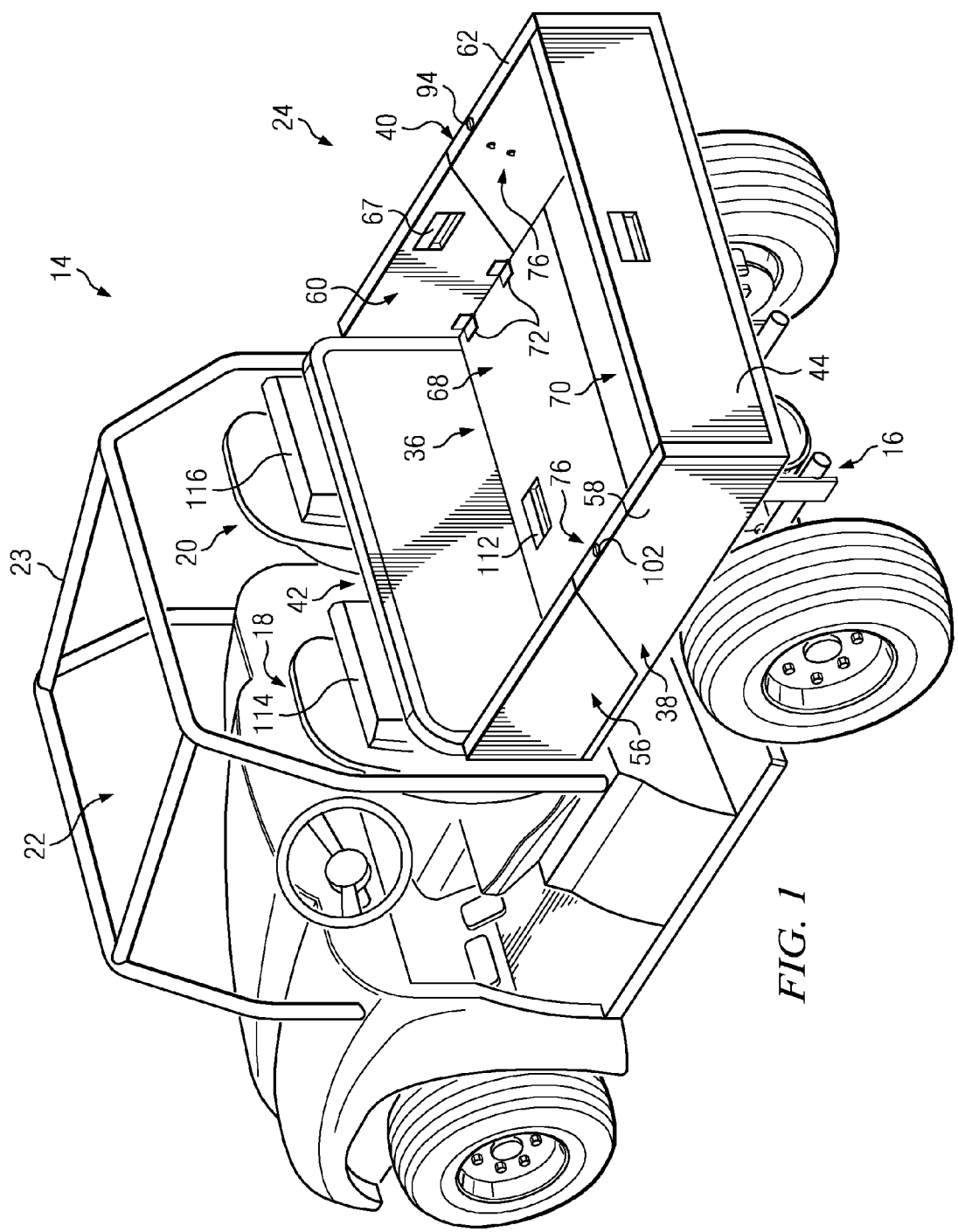
FIG. 1 is a left rear perspective view depicting a vehicle in accordance with one embodiment.

Embodiments are hereinafter described in detail in connection with the views of FIGS. 1-13. A vehicle includes a utility bed which can be used to facilitate hauling of cargo by the vehicle. In one embodiment, the vehicle can be a dump-type vehicle having a utility bed that can facilitate selective dumping of cargo from the utility bed. A dump-type vehicle can comprise a light utility vehicle, such as the utility vehicle 14 shown in FIGS. 1-13. In other embodiments, a dump-type vehicle can comprise any of a variety of other types of vehicles having a utility bed that is capable of dumping (e.g., a dump bed) such as, for example, a pickup truck, a dump truck, an all terrain vehicle ("ATV"), and a golf cart, for example. In another embodiment, the vehicle can be a non-dump type vehicle having a utility bed that is rigidly affixed to the vehicle's frame (e.g., a non-dumpable bed). In yet another embodiment, the vehicle can be a trailer.

Referring again to FIGS. 1-13, the utility vehicle 14 can include a vehicular frame 16. The vehicular frame 16 can include any of a variety of structural and/or decorative rails, panels, and/or other components which are typically, although not necessarily, formed from metal (e.g., steel and/or aluminum). A left front seat 18 and a right front seat 20 can each be supported by the vehicular frame 16 and can facilitate support of occupants within a passenger compartment 22 that is defined by a front roll bar assembly 23. The utility vehicle 14 can also include a utility bed 24 which can be coupled with the vehicular frame 16, either directly or indirectly, and such as through use of a hinge assembly 26, shown in FIG. 2. The hinge assembly 26 can facilitate pivotable movement of the utility bed 24 with respect to the vehicular frame 16 of the utility vehicle 14 between a hauling position (shown in FIGS. 1 and 3) and a dumping position (shown in FIG. 2). When the utility bed 24 is in the hauling position, the utility bed 24 can rest upon a rest surface 27 (FIG. 2) provided by a rest structure 28 which can be attached to the vehicular frame 16 of the utility vehicle 14. In one embodiment, the rest structure 28 can comprise a rigid structure (e.g., formed from sheet metal), though in another embodiment, a rest structure can comprise a resilient element (e.g., a rubber bumper).

Figure 2:
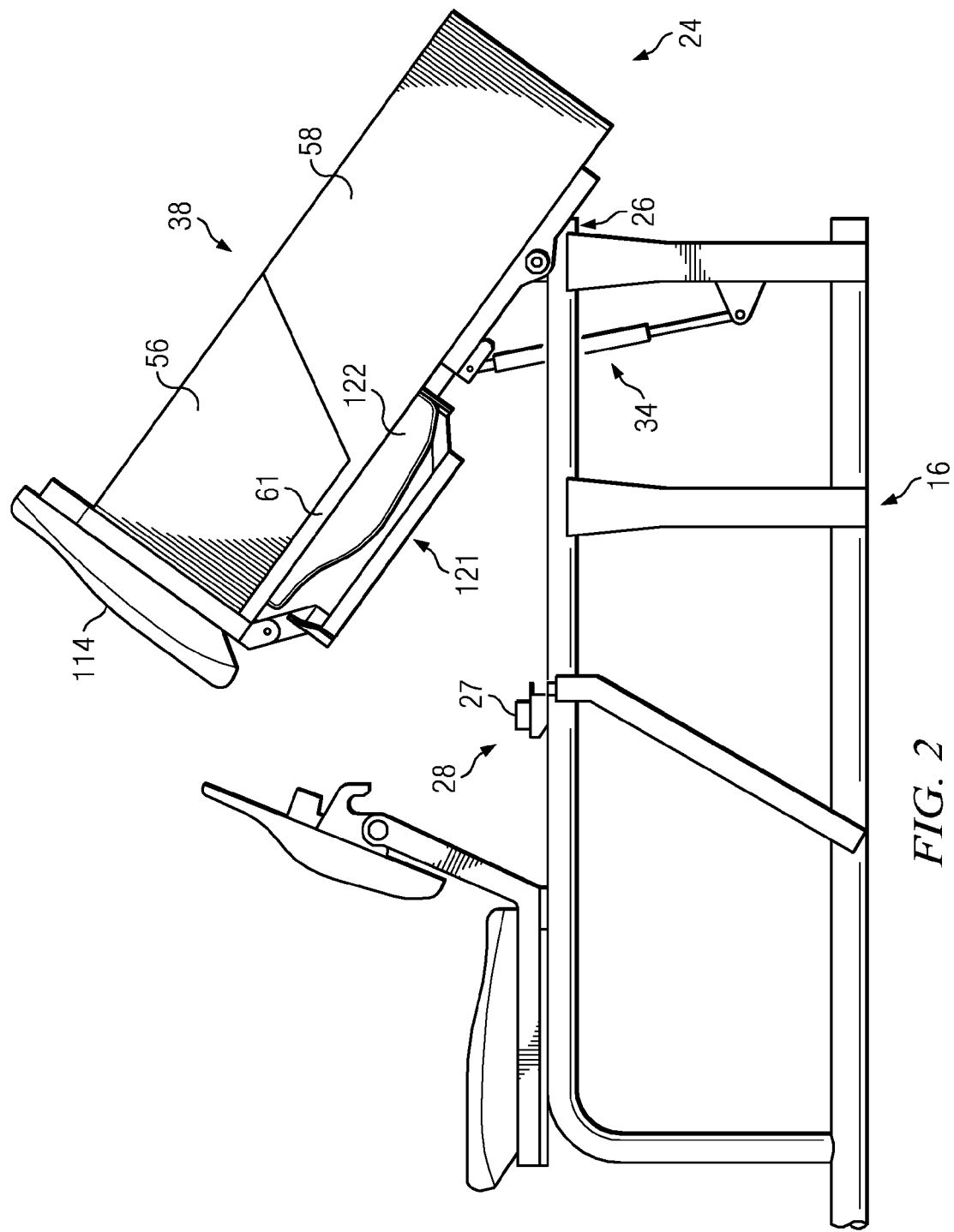
FIG. 2 is a left side elevational view depicting a utility bed and various other components of the vehicle of FIG. 1, wherein the utility bed is shown in a dumping position.

The utility vehicle 14 can include an actuator 34 coupled with the vehicular frame 16 and the utility bed 24. The actuator 34 can be configured to facilitate movement of the utility bed 24 between the hauling position and the dumping position. In one embodiment, the actuator 34 can comprise a linear actuator, as illustrated in FIG. 2, which can be an electric actuator in some embodiments. It will be appreciated that any of a variety of known conventional mechanisms or methods can be provided to facilitate manual or powered movement of the utility bed 24 between the hauling and dumping positions under control of an operator of the utility vehicle 14.

In the embodiment of FIGS. 1-13, the utility bed 24 is shown to comprise a bed floor 36. The utility bed 24 is also shown to include a left sidewall 38 and a right sidewall 40, each extending generally perpendicularly from the bed floor 36 or locations adjacent to the bed floor 36. The utility bed 24 can also include end walls such as a front wall 42 and a tailgate 44, as illustrated in FIGS. 1-3 and 5-6. The tailgate 44 can be pivotally coupled with respect to the bed floor 36. When the utility bed 24 is in the hauling position (shown in FIGS. 1 and 3), it will be appreciated that the left sidewall 38, the right sidewall 40, and the front wall 42 can cooperate with the bed floor 36 to retain cargo within the utility bed 24. The tailgate 44, when closed (as shown in FIGS. 1-3 and 5-6), can also cooperate with the left sidewall 38, the right sidewall 40, and the bed floor 36 to retain cargo within the utility bed 24. It will be appreciated that the tailgate 44 can be selectively opened to facilitate loading of the utility bed 24 and/or to allow cargo (e.g., dirt) to pour from the utility bed 24 when the utility bed 24 is in a dumping position (shown in FIG. 2). In another embodiment, it will be appreciated that a rear wall can be provided in lieu of a tailgate with the rear wall being rigidly affixed with respect to a bed floor of a utility bed such that it might not be capable of being selectively opened by an operator.

Figure 4:
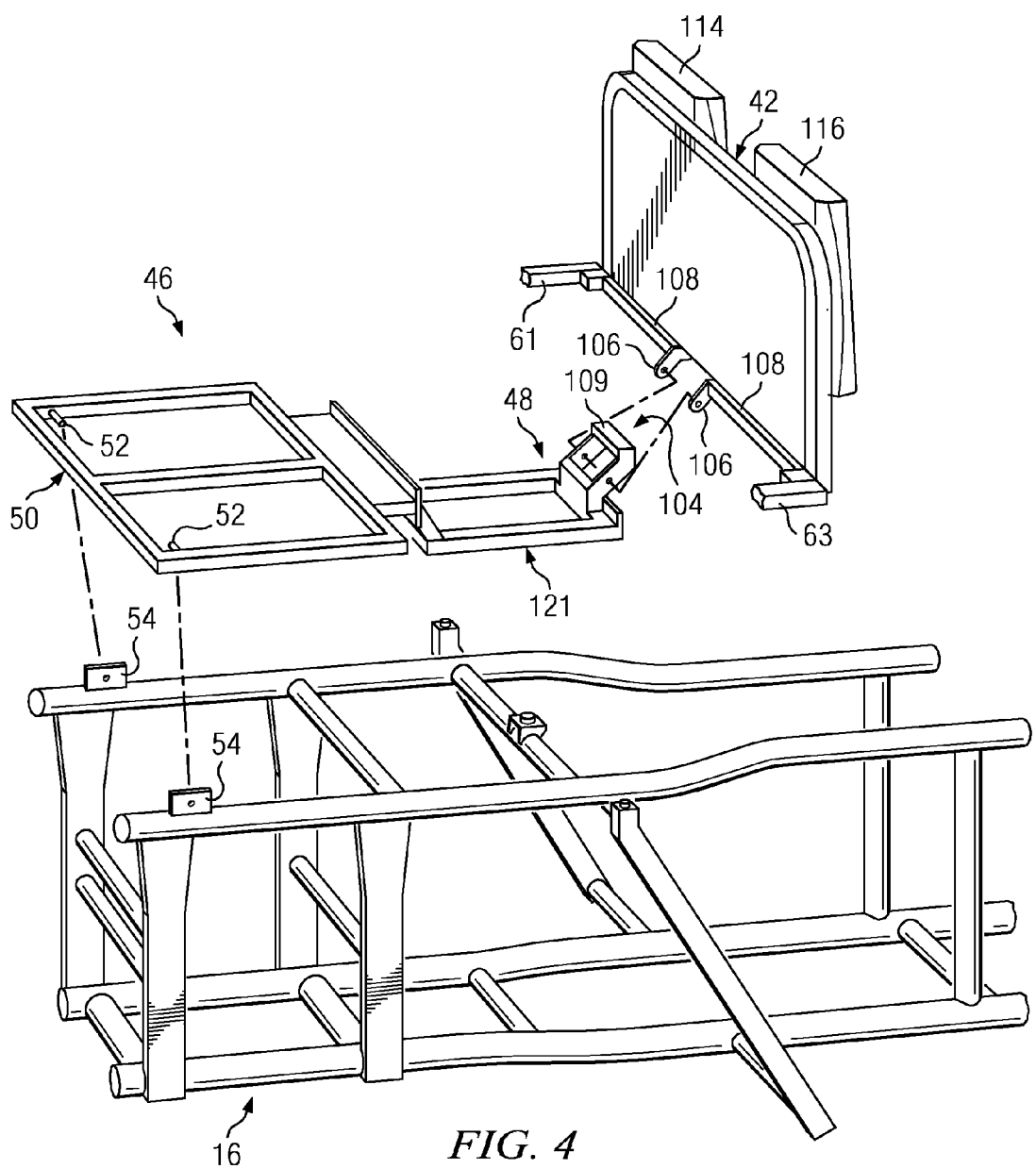
FIG. 4 is an exploded view of the front wall, a bed frame, a vehicular frame, and various other components of the vehicle of FIG. 1.
Figure 5:
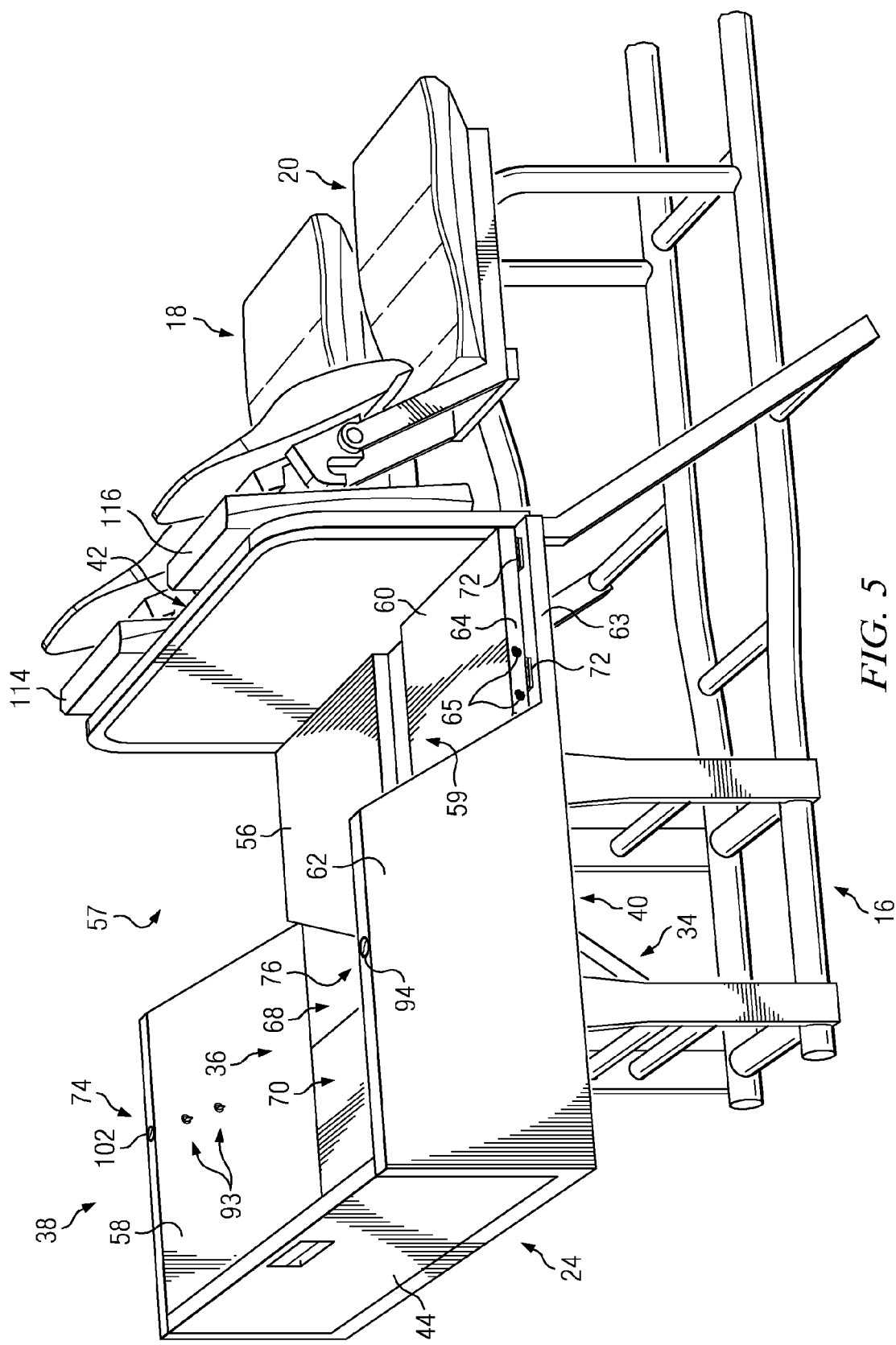
FIG. 5 is a right rear perspective view similar to FIG. 3 but with the left and right doors in opened positions.

In one embodiment, a bed frame 46 can be configured to provide underlying and structural support for certain components of the utility bed 24. As illustrated in FIG. 4, the bed frame 46 can comprise a tubular frame structure that extends along a length of the bed floor 36 and underneath the bed floor 36, as illustrated in FIGS. 4 and 5, to provide underlying support for the bed floor 36, the left and right sidewalls 38, 40, and/or the front wall 42. The bed frame 46 can include a front portion 48 and a rear portion 50. The rear portion 50 of the bed frame 46 can include pins 52 of the hinge assembly 26. Brackets 54 can be attached to the vehicular frame 16. The pins 52 can be journalled (e.g., with bearings) within the corresponding brackets 54 of the hinge assembly 26 to facilitate pivoting of the utility bed 24 relative to the vehicular frame 16. It will be appreciated that a bed frame can be provided in any of a variety of suitable alternative arrangements. For example, a bed frame might be integrally formed as part of a bed floor such as in a one-piece bed floor/bed frame configuration.

Figure 3:
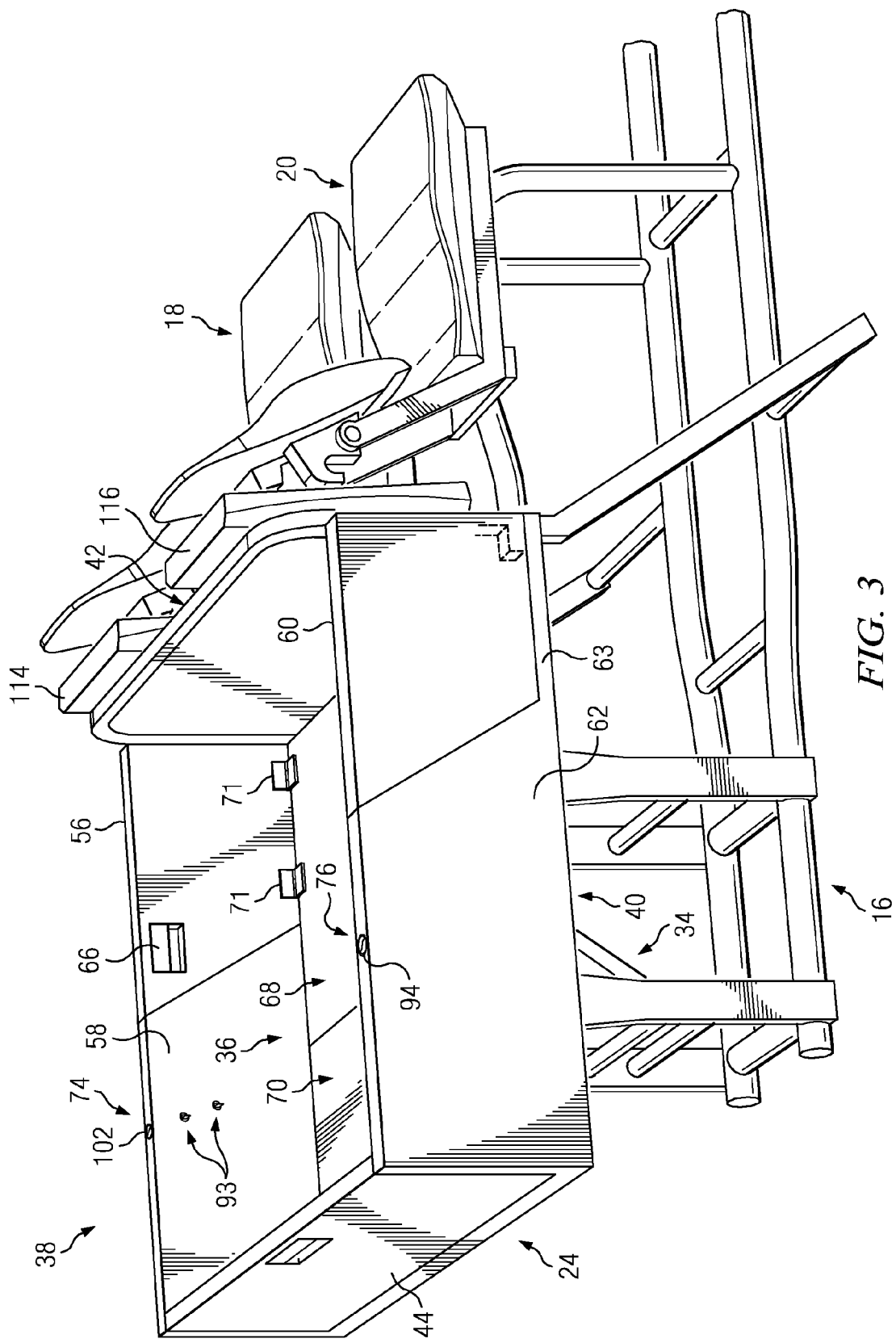
FIG. 3 is a right rear perspective view depicting the utility bed and various other components of the vehicle of FIG. 1, wherein the utility bed is shown in a hauling position with a front floor in a cargo support position, left and right doors in closed positions, and a front wall in an upright position.

As illustrated in FIG. 3, the left sidewall 38 can include a left door 56 and a left rear sidewall portion 58. The right sidewall 40 can include a right door 60 and a right rear sidewall portion 62. The left and right doors 56, 60 can each be pivotable between a closed position (FIG. 3) and an opened position (FIG. 5). The left and right rear sidewall portions 58, 62 can be rigidly coupled with the bed frame 46. When in the closed position, each of the left and right doors 56, 60 can cooperate with the bed floor 36, the front wall 42, and the remaining portions of the left and right sidewalls 38, 40 to retain cargo within the utility bed 24. When the left and right doors 56, 60 are moved to the opened position, the left and right rear sidewall portions 58, 62 can remain upright such that left and right openings 57, 59 are defined.

The left and right sidewalls 38, 40 can be configured to ensure that the left and right doors 56, 60 maintain proper aesthetics when in the closed positions. As illustrated in FIGS. 1-3 and 5-6, the left and right sidewalls 38, 40 can each define a respective lower horizontally extending portion 61, 63. When the left and right doors 56, 60 are in their respective closed positions, the lower horizontally extending portions 61, 63 can cooperate with the left and right doors 56, 60 to give the appearance of substantially continuous left and right sidewalls 38, 40.

Figure 6:
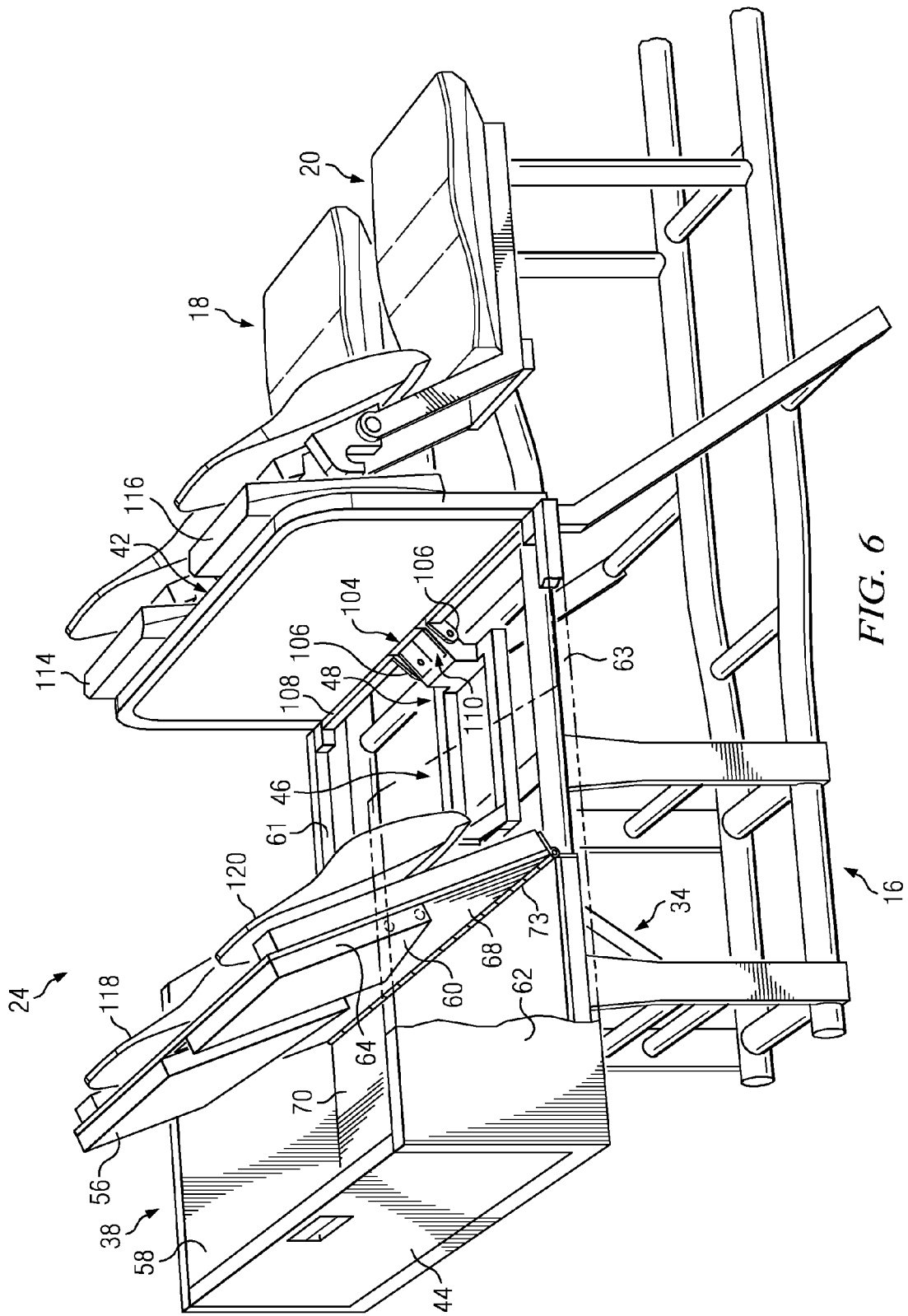
FIG. 6 is a right rear perspective view similar to FIG. 5 but with the front floor of the utility bed in an upright position.
Figure 9:
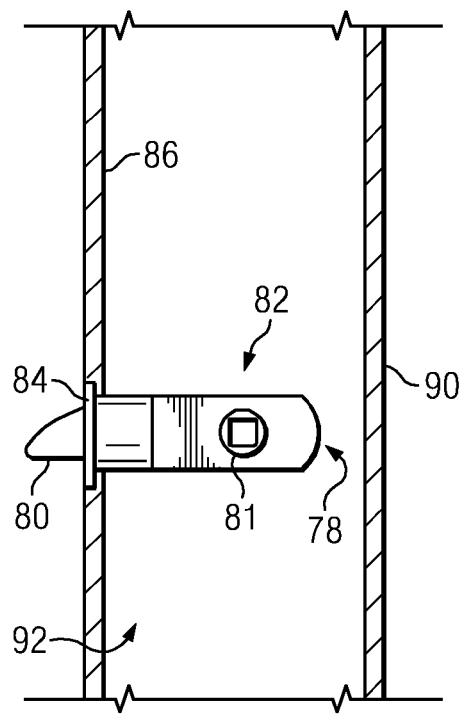
FIG. 9 is a cross-sectional view depicting the right sidewall of FIG. 8 taken along section line 9-9 in FIG. 8, but with certain components of the right locking member removed for clarity of illustration and with a plunger of a latch in an extended position.

In one embodiment, as illustrated in FIGS. 5 and 6, the right door 60 can include a lower surface 64. The lower surface 64 can define a pair of receptacles 65. The receptacles 65 can be concealed by the lower horizontal portion 63 of the right sidewall 40 when the right door 60 is in the closed position (FIGS. 2 and 3) and can be revealed when the right door 60 is moved to the opened position (FIGS. 5 and 6). The left door 56 can include a lower surface (not shown) that is similar in many respects as the lower surface 64 of the right door 60. For example the lower surface of the left door 56 can define receptacles (not shown) that are selectively concealed by the lower horizontally extending portion 61 of the left sidewall 38.

In one embodiment, a seal can be provided along the perimeter of each of the left and right doors 56, 60. Each seal can facilitate selective sealing of the interaction between the doors 56, 60, the respective rear sidewall portion 58, 62, and the lower horizontally extending portion 61, 63 of the left and right sidewall 38, 40. In one embodiment, the left and right doors 56, 60 can each include a manually-operated handle (e.g., 66, 67) that facilitates selective securing of the respective door (e.g., 56, 60) in the closed position.

As illustrated in FIG. 3, the bed floor 36 can include a front floor 68 and a rear floor 70. The left and right doors 56, 60 can be pivotally attached to the front floor 68 such that, when the left and right doors 56, 60 are in the opened position, they can each lie substantially parallel with and against the front floor 68. In one embodiment, the left and right doors 56, 60 can be pivotally coupled with the front floor 68 with respective pairs of hinges 71, 72 (shown in FIGS. 3 and 5). In other embodiments, however, left and right doors can be coupled with a bed floor in any of a variety of suitable alternative pivotal arrangements.

With the left and right doors 56, 60 in the opened position, as illustrated in FIG. 5, the front floor 68 can pivot with respect to the rear floor 70 from a cargo support position (FIGS. 3 and 5) to an upright position (FIG. 6). The front floor 68 is shown in FIG. 6 to be pivotally attached to the rear floor 70 with a hinge 73 to facilitate pivoting of the front floor 68 between the cargo support position and the upright position. In other embodiments, however, it will be appreciated that a front floor can be movably coupled with a bed frame in any of a variety of suitable alternative arrangements. For example, a front floor can be pivotally attached directly to a bed frame.

Figure 10:
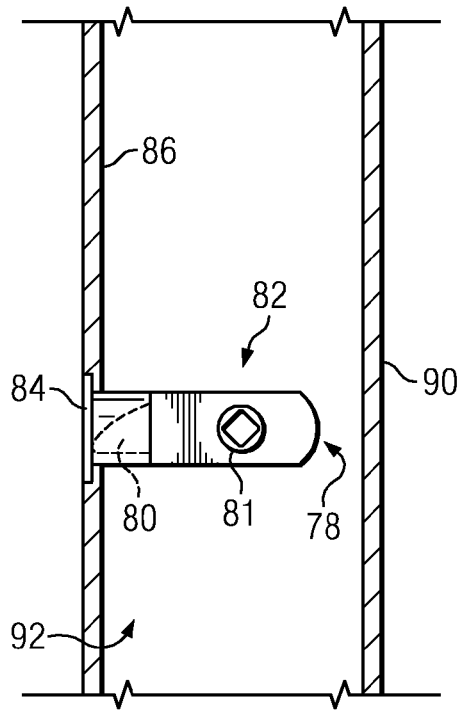
FIG. 10 is a cross-sectional view similar to FIG. 9, but with the plunger in a retracted position.

The utility bed 24 can include left and right locking mechanisms 74, 76 that can be configured to selectively retain the front floor 68 in the upright position. The left and right locking mechanisms 74, 76 can be associated with respective left and right sidewalls 38, 40 to facilitate retention of the front wall 68 in the upright position. In one embodiment, as illustrated in FIG. 7, the right locking mechanism 76 can include a pair of latches 78 and a selector 94. Each of the latches 78 can include a plunger 80, an actuator 81, a body 82, and a strike plate 84. Each plunger 80 can be operably coupled with the respective actuator 81 such that rotation of the actuator 81 moves the plunger 80 between an extended position (FIGS. 7-9) and a retracted position (FIG. 10). The selector 94 can include a stem portion 96 and a gripping portion 98. The stem portion 96 can be disposed through the each of the actuators 81 such that a user can rotate the gripping portion 98 to simultaneously actuate the plungers 80.

As illustrated in FIGS. 8-11, the right locking mechanism 76 can be associated with the right rear sidewall portion 62. The right rear sidewall portion 62 can include an inner wall 86, an upper wall 88, and an outer wall 90 that can cooperate to at least partially define an interior chamber 92. The latches 78 can be coupled with the inner wall 86 such that the strike plate 84 of each latch 78 can engage the inner wall 82 (shown in FIGS. 8-10) and such that the body 82 of each plunger 80 is concealed within the interior chamber 92. In one embodiment, the strike plate 84 can be disposed within the inner wall 86 such that the strike plate 84 and inner wall 86 define a planar surface. The latches 78 can be arranged along the inner wall 86 to facilitate interaction between plungers 80 and the receptacles 65 of the right door 60. In one embodiment, as illustrated in FIG. 8, the upper wall 88 of the right rear sidewall portion 62 can define a recess 100 that can house the gripping portion 98 of the selector 94. In some embodiments, the recess 100 can additionally facilitate selective concealment of the gripping portion 98 by a cover (not shown).

Figure 11:
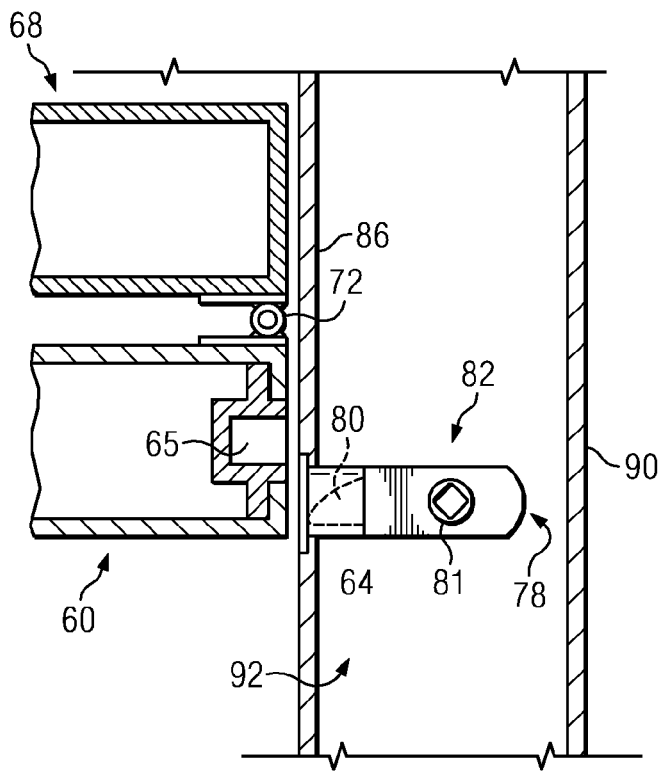
FIG. 11 is a cross-sectional view similar to FIG. 10, but with the right rear sidewall portion shown in association with a front floor and a right door, wherein the right door is shown adjacent to the latch.
Figure 12:
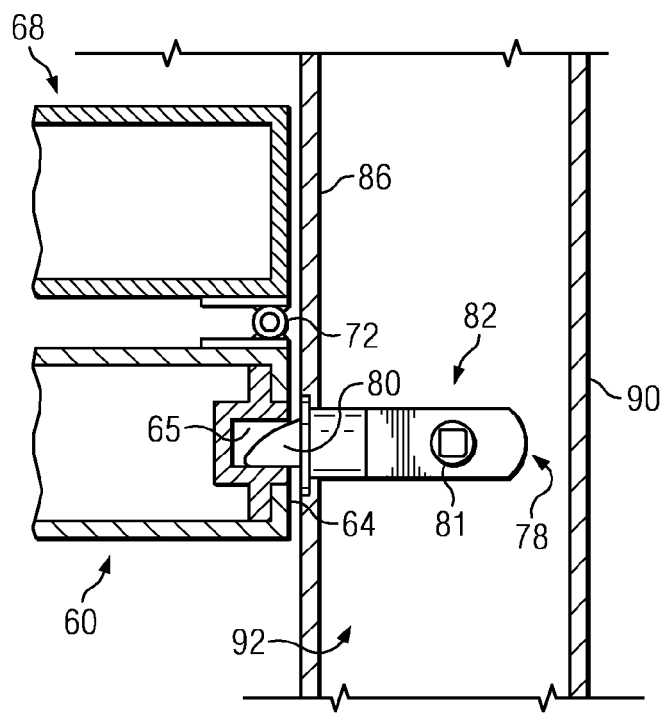
FIG. 12 is a cross-sectional view similar to FIG. 11, but with the front floor in the upright position and the plunger disposed in a receptacle defined by the lower surface of the right door.

In one embodiment, the plungers 80 can be biased to the extended position such as with an internal resilient member (not shown), for example. In such an embodiment, when the plunger 80 is in the extended position, it can be moved to the retracted position without actuating the actuator 81 (e.g., by applying an external force to the plunger 80). As described above, when the right door 60 is in the opened position, as illustrated in FIGS. 5 and 6, the receptacles 65 can be exposed. When the front floor 68 is moved from the cargo support position to the upright position, the lower surface 64 of the right door 60 can make contact with the plungers 80. As the front floor 68 moves toward the cargo support position, as illustrated in FIG. 11, the lower surface 64 can push and hold the plungers 80 in the retracted position. Once the receptacles 65 become aligned with the plungers 80, the plungers 80 can automatically move into the associated receptacles 65 (e.g., to the extended position) to engage the right door 60 to facilitate retention of the front floor 68 in the upright position. In another embodiment, the latches 78 can be arranged in a dead-bolt configuration. In such an arrangement, the plunger 80 can be directly coupled with the actuator 81 such that the plunger 80 can only be moved through actuation of the actuator 81.

The left locking mechanism 74 can also include a pair of latches 93 (FIGS. 3 and 5) that are similar in many respects to, or the same as, the latches 78 of the right locking mechanism 76, but disposed along the left rear sidewall portion 58. The latches 93 of the left locking mechanism 74 can accordingly be configured to interact with the receptacles of the left door 56 in a similar manner as described above with respect to the latches 78 of the right locking mechanism 76 and the receptacles 65 of the right door 60.

The left locking mechanism 74 can also include a selector 102 (shown in FIGS. 3 and 5) that is similar in many respects to, or the same as, the selector 94 of the right locking mechanism 76 but disposed along the left rear sidewall portion 58. The latches 93 of the left locking mechanism 74 can accordingly be configured to interact with the selector 102 of the left locking mechanism 74 in a similar manner as described above with the latches 78 of the right locking mechanism 76.

In one embodiment, a user can operate the selectors 94, 102 to selectively lock and/or release the front floor 68 from the upright position. For example, when the front floor 68 is in the upright position, the latches 78, 93 of each left and right locking mechanism 74, 76 can retain the front floor 68 in the upright position. During operation of the utility vehicle 14, the left and right locking mechanisms 74, 76 can therefore prevent the front floor 68 from inadvertently moving to the cargo support position while simultaneously preventing the left and right doors 58, 60 from pivoting with respect to the front floor 68. To release the front floor 68 from the upright position, a user can operate the selectors 94, 102 (e.g., through manual or powered operation) to move the plungers (e.g., 80) of the latches 78, 93 into the retracted positions and out of the receptacles (e.g., 65) of the left and right doors 56, 60. The front floor 68 is then free to move to the cargo support position.

In one embodiment, the selectors 94, 102 can be configured to retain the plungers (e.g., 80) of each latch 78, 93 in a retracted position when not in use. In such an embodiment, the selectors 94, 102 can rotate into a locked position (not shown) that facilitates retention of the plungers (e.g., 80) of each latch 78, 93 in a retracted position. For example, when the front floor 68 is in the cargo support position, the selectors 94, 102 can be rotated to their locked positions to retain the plungers (e.g., 80) of each associated latch 78, 93 in a retracted position and away from cargo that may be loaded into the utility bed 24. In one embodiment, the strike plates (e.g., 84) of each of the latches 78, 93 can include a hinged cover. In such an embodiment, when the plunger (e.g., 80) is in the retracted position, the hinged cover can automatically overlie the plunger to prevent the plunger from catching on passing debris and/or prevent debris from entering the latch (e.g., 78, 93) and interfering with proper operation of the latch (e.g., 78, 93). In some embodiments, the selectors. 94, 102 can be operated independent of each other, but in other embodiments, the selectors 94, 102 can be operably coupled together (e.g., with a rack and pinion mechanism) such that operation of one of the selectors (e.g., 94) simultaneously operates the other selector (e.g., 102).

Although the latches 78, 93 and selectors 94, 102 are shown to be provided in a setback-type arrangement, it will be appreciated that a latch and selector can be configured in any of a variety of suitable alternative arrangements that facilitates selective coupling of a front floor with left and right sidewalls and thus selective retention of the front floor in an upright position. It will also be appreciated that although the left and right locking mechanisms 74, 76 are shown to be provided upon respective left and right rear sidewall portions 58, 62, a locking mechanism can be associated with a sidewall in any of a variety of suitable alternative arrangements. For example, left and right locking mechanisms can be coupled with the front floor 68 and can include latches that are configured similar to latches 78, 93 described above. The left and right sidewalls can define receptacles and, when the front floor is in the upright position, plungers from the latches of each of the left and right locking mechanisms can be disposed into the respective receptacles defined by the left and right rear sidewall portions to retain the front floor 68 in the upright position. In another example, the left and right locking mechanisms can include powered electromagnets. When the front floor is in the upright position, the electromagnets can be energized to magnetically engage a portion of the left and right sidewalls to retain the front floor in the upright position. Although the utility bed 24 has been described above to include a pair of locking mechanisms (e.g., 74, 76), it will be appreciated that in some embodiments, a utility bed may include a single locking mechanism or may include more than two locking mechanisms.

In one embodiment, the rear floor 70 can be fixed with respect to the bed frame 46 such as through welded attachment. However, in other embodiments, the rear floor 70 can be pivotally or otherwise movably attached to the bed frame 46. For example, the rear floor 70 can be pivotally attached to the bed frame 46 to facilitate selective access to the area underlying the utility bed 24 (e.g., facilitating access to the hinge assembly 26). It will be appreciated however, a bed floor can be provided in any of a variety of suitable alternative arrangements which in some embodiments might not include a rear floor.

It will be appreciated that any of a variety of known conventional mechanisms or methods (none shown) can be provided to facilitate manual or powered movement of the front floor 68 between the cargo support position and the upright position. For example, the front floor 68 can include a selectively concealable handle (not shown) which can be grasped by a user to manually move the front floor 68 between the upright and cargo support positions. In another embodiment, an electronic linear actuator can be coupled with each of the rear floor 70 and the bed frame 46 to facilitate powered movement of the front floor 68.

Figure 13:
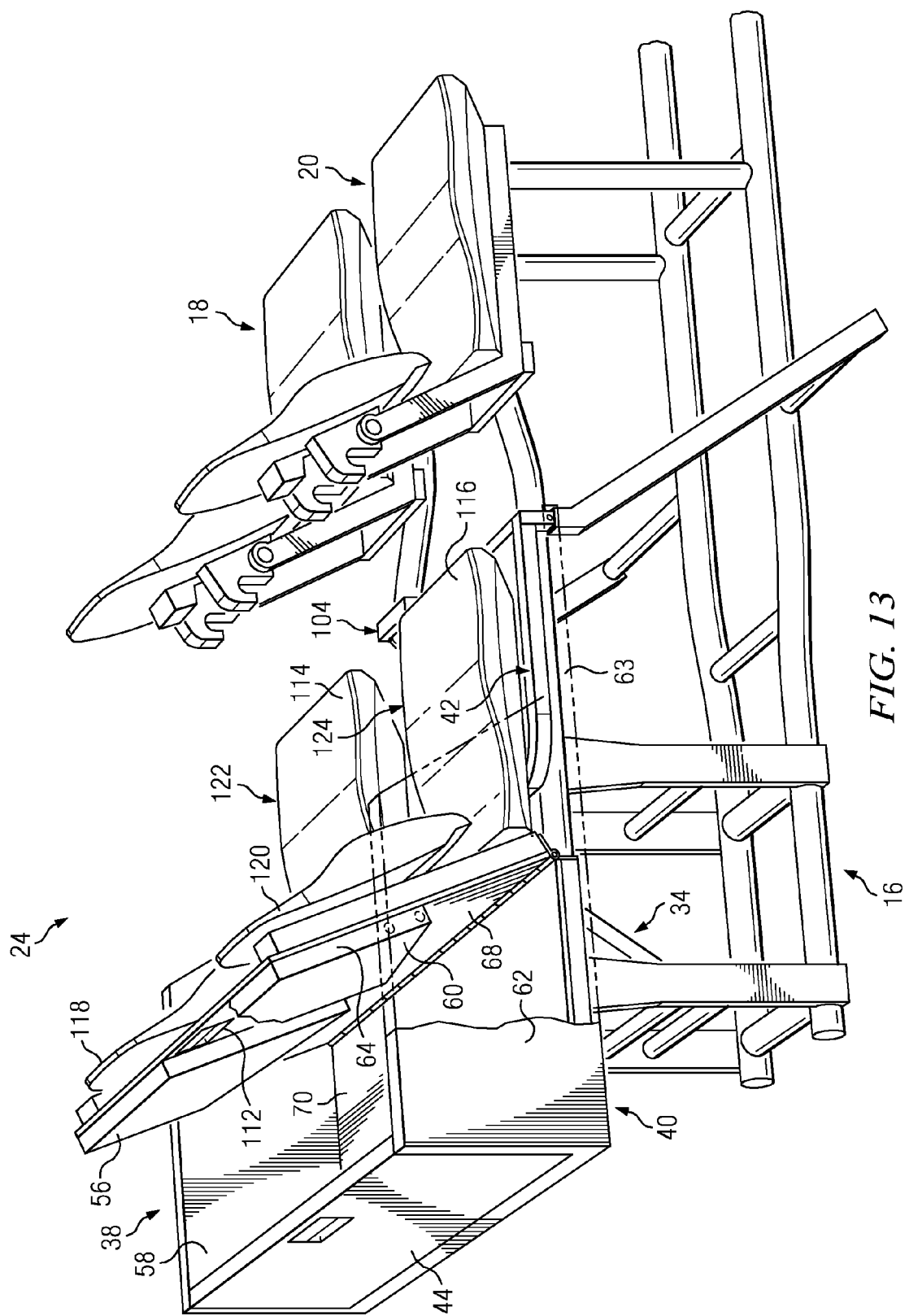
FIG. 13 is a right rear perspective view similar to FIG. 6 but with the front wall in a collapsed position.

As illustrated in FIGS. 5-6, and 13, the front wall 42 can be pivotable between an erected position (FIGS. 5 and 6) and a collapsed position (FIG. 13). In one embodiment, the front wall 42 can be pivotally attached to the bed frame 46 to facilitate pivoting of the front wall 42 between the erected position and the collapsed position. As illustrated in FIGS. 4 and 6, the bed frame 42 can include a neck portion 104 that extends from the front portion 48 of the bed frame 46. The front wall 42 can include a pair of hinge arms 106 that can be pivotally coupled with the neck portion 104. The hinge arms 106 can be pivotally attached to the neck portion 104 (e.g., with pins). In one embodiment, the hinge arms 106 can be attached (e.g., through welding) to a bottom of the front wall 42 and to adjacent flange members 108 that are also attached to the bottom edge of the front wall 42. In such an arrangement, the neck portion 104 can rest upon the rest surface 27 (FIG. 2) provided by the rest structure 28 when the utility bed 24 is in the hauling position.

It will be appreciated that a front wall can be pivotally coupled or otherwise movably coupled with a bed frame in any of a variety of suitable alternative arrangements. For example, a front wall can be pivotally attached to the vehicular frame 16 such that pivoting the utility bed 24 to the dumping position does not correspondingly move the front wall. In another example, a front wall can be movably secured to a bed frame through the use of tracks such that the front wall can slide with respect to the bed frame (e.g., between the erected and collapsed positions).

When the front wall 42 is in the erected position, as illustrated in FIGS. 5-6 and 13, the front wall 42 can rest upon an upper surface 109 (shown in FIG. 4) of the neck portion 104. However, when the front wall 42 is in the collapsed position, the front wall 42 can lie adjacent to the neck portion 104 such that the neck portion 104 extends slightly above the front wall 42 (as illustrated in FIG. 13). As illustrated in FIGS. 5 and 6, when the front wall 42 is in the erected position, the flange members 108 of the front wall 42 can support the front floor 68 when the front floor 68 is in the cargo support position. The neck portion 104 can additionally define a receptacle 110. The receptacle 110 can selectively receive a portion of a catch member 112 (shown in FIGS. 1 and 13) that facilitates selective securement of the front floor 68 in the cargo support position. Alternatively, the front floor 68 can be selectively secured to the bed frame 46 using any of a variety of other suitable releasable fasteners and/or mechanism(s).

A left seat bottom 114 and a right seat bottom 116 can be coupled (e.g., either directly or indirectly) with the front wall 42. A left seat back 118 and a right seat back 120 can be coupled (e.g., either directly or indirectly) with the front floor 68. As illustrated in FIGS. 1-3, when the front floor 68 is in the cargo support position with the front wall 42 in the erected position, the left and right seat backs 118, 120 can be concealed beneath the utility bed 24 and the left and right seat bottoms 114, 116 can be stowed behind the left and right front seats 18, 20. In such an arrangement, the front floor 68 and the rear floor 70 can cooperate to define a planar support surface that is configured to directly contact and provide underlying support for cargo (not shown) disposed within the utility bed 24. The bed frame 46 can include a cradle portion 121 (FIGS. 2 and 4) that can selectively underlie the left and right seat backs 118, 120. When the front floor 68 is in the cargo support position, as illustrated in FIG. 2, the cradle portion 121 can protect the right and left seat backs 118, 120 from being contacted (e.g., by underlying debris) during operation of the utility vehicle 14.

The utility bed 24 can accordingly be converted into rear seats for the utility vehicle 14. As illustrated in FIG. 5, the left and right doors 56, 60 can be moved to their opened positions to reveal the respective left and right openings 57, 59. As illustrated in FIG. 6, the front floor 68 can be moved to the upright position to reveal the left seat back 118 and the right seat back 120. As illustrated in FIG. 13, once the front floor 68 is moved to the upright position, the front wall 42 can be pivoted to the collapsed position to move the left and right seat bottoms 114, 116 into a generally horizontal position. In such an arrangement, the left and right seat backs 118, 120 can cooperate with the respective left and right seat bottoms 114, 116 to define a left rear seat 122 and a right rear seat 124. Additionally, the left and right openings 57, 59 that are defined by opening the left and right doors 56, 60 can facilitate the ingress/egress of a passenger to/from the left and right rear seats 122, 124. It will be appreciated, therefore, that the left and right locking mechanisms 74, 76 might facilitate more effective retention of the left and right seat backs 118, 120 for seated passengers during operation of the utility vehicle 14.

While the relative movement of the front floor 68, the left and right doors 56, 60, and the front wall 42 is shown in FIGS. 1-3, 5-6, and 13, to be sequential, a utility bed can alternatively be provided that allows the front floor 68, the left and right doors 56, 60, and/or the front wall 42 to be moved independent of one another. In one embodiment, the front floor 68, the left and right doors 56, 60, and/or the front wall 42 can be moved manually. In another embodiment, the front floor 68, the left and right doors 56, 60, and/or the front wall 42 can be moved automatically, such as by actuating a pushbutton. In such an embodiment, each of the front floor 68, the left and right doors 56, 60, and the front wall 42 can be moved with motorized actuators.

It will be appreciated, that although the embodiment of FIGS. 1-13 illustrates forward facing rear seats which are face towards a frontmost portion of the utility bed 24, rear seats can be provided on a utility bed in any of a variety of suitable alternative arrangements. In one embodiment, a rear floor of the utility bed can include left and right seat backs and can be pivotable between a cargo support position and an upright position. A rear wall of the utility bed can include left and right seat bottoms and can be pivotable between an erected position and a collapsed position. When the rear wall is pivoted to the collapsed position with the rear floor in the upright position, the left and right seat backs respectively cooperate with the left and right seat bottoms to define rearwardly facing left and right rear seats. Locking mechanisms can be provided to selectively retain the rear floor in the upright position. In such an embodiment, the left and right sidewalls may or may not include respective left and right side doors since the rear seats can be accessed from the rear of the utility vehicle.

It will also be appreciated, that although the end walls (e.g., front and rear walls) have been described as being pivotable, end walls can be movable in any of a variety of suitable alternative manners to selectively reveal a seat bottom. In one embodiment, a front wall can be removable from the utility bed to facilitate manual positioning of the front wall in the erected or collapsed position. It will also be, appreciated that the floor portions, such as front and rear portions can be movable in any of a variety of suitable alternative manners.

Although the embodiments above have been described with respect to individual left and right rear seats, it will be appreciated that in other embodiments the utility bed can include more than two rear seats or less than two rear seats. In yet another embodiment, the utility bed can provide left and right seats that can be deployed independent of each other. In such an embodiment, a front wall can be bifurcated into left and right portions. Each left and right portion can support a seat bottom. A front floor of the utility bed can be similarly bifurcated into left and right portions. Each left and right portion can support a seat back. In such an arrangement, left and right rear seats can be individually and selectively erected from the utility bed. It will also be appreciated that rear seats can be provided along a utility bed in any of a variety of suitable alternative arrangements. For example, rear seats can be rigidly affixed to a bed floor of a utility bed.

While various embodiments of a vehicle have been illustrated by the foregoing description and have been described in detail with respect to FIGS. 1-13, it is not intended to be exhaustive or to limit the scope of the appended claims to such detail. Numerous modifications are possible in light of the above teachings. Some of those modifications have been discussed and others will be understood by those skilled in the art.

What is claimed is:

1. A utility bed comprising:
   a bed frame;
   a bed floor associated with the bed frame and including a first floor portion and a second floor portion, the first floor portion being pivotally coupled with the second floor portion and pivotable between an upright position and a cargo support position;
   a first sidewall comprising a door portion and a wall portion, the door portion being pivotally coupled with the first floor portion and pivotable between a closed position and an opened position; and
   a first locking mechanism comprising a latch coupled with the wall portion of the first sidewall, the latch comprising a plunger, the first locking mechanism being configured to retain the first floor portion in the upright position with the door portion of the first sidewall in the opened position;
   wherein the door portion of the first sidewall defines a receptacle that is configured to selectively receive the plunger when the door portion of the first sidewall is in the opened position with first floor portion in the upright position.

2. The utility bed of claim 1 wherein the wall portion of the first sidewall is rigidly coupled with the bed frame.

3. The utility bed of claim 1 wherein the door portion of the first sidewall comprises a lower surface that defines the receptacle.

4. The utility bed of claim 1 further comprising a selector operably coupled with the plunger, wherein the plunger is movable between a retracted position and an extended position in response to movement of the selector.

5. The utility bed of claim 1 wherein the bed frame is configured to pivot between a hauling position and a dumping position.

6. A utility bed comprising:
   a bed frame;
   a bed floor associated with the bed frame and including a first floor portion and a second floor portion, the first floor portion being pivotally coupled with the second floor portion and pivotable between an upright position and a cargo support position;
   a first sidewall comprising a door portion and a wall portion, the door portion being pivotally coupled with the first floor portion and pivotable between a closed position and an opened position;
   a first locking mechanism associated with the first sidewall, the first locking mechanism being configured to retain the first floor portion in the upright position with the door portion of the first sidewall in the opened position; and
   an end wall pivotally coupled with the bed frame relative to the first floor portion and pivotable between an erect position and a collapsed position, wherein a seat back is coupled with the first floor portion, a seat bottom is coupled with the end wall, and when the first floor portion is in the upright position with the end wall in the collapsed position, the seat back and the seat bottom cooperate to provide a seat.

7. The utility bed of claim 6 wherein the end wall comprises a front wall.

8. The utility bed of claim 7 wherein the door portion of the first sidewall is adjacent the front wall when the door portion is in the closed position.

9. A utility bed comprising:
   a bed frame;
   a bed floor associated with the bed frame and including a first floor portion and a second floor portion, the first floor portion being pivotally coupled with the second floor portion and pivotable between an upright position and a cargo support position;

a left sidewall comprising a left door portion and a left wall portion, the left door portion being pivotally coupled with the first floor portion and pivotable between a closed position and an opened position;

a left locking mechanism associated with the left sidewall;

an end wall pivotally coupled with the bed frame and pivotable between an erect position and a collapsed position;

a right sidewall comprising a right door portion and a right wall portion, the right door portion being pivotally coupled with the first floor portion and pivotable between a closed position and an opened position;

a right locking mechanism associated with the right sidewall, a seat back coupled with the first floor portion of the bed floor; and a seat bottom coupled with the end wall;

wherein, when the left door portion and the right door portion are in respective opened positions, the left locking mechanism and the right locking mechanism are configured to selectively engage the left door portion and the right door portion, respectively, to retain the first floor portion of the bed floor in the upright position.

10. The utility bed of claim 9 wherein the left door portion and the right door portion are each substantially parallel with the first floor portion of the bed floor when the left door portion and the right door portion are in respective opened positions.

11. The utility bed of claim 9 wherein when the first floor portion of the bed floor is in the upright position with the end wall in the collapsed position, the seat back and the seat bottom cooperate to provide a seat.

12. The utility bed of claim 11 wherein the seat comprises a forward-facing rear seat.

13. The utility bed of claim 9 wherein the second floor portion is rigidly coupled with the bed frame.

14. The utility bed of claim 9 wherein, when the first floor portion is in the cargo support position, the first floor portion and the second floor portion cooperate to define a planar surface.

15. The utility bed of claim 9 wherein the left locking mechanism comprises a left latch, the left latch comprises a left plunger, the right locking mechanism comprises a right latch, the right latch comprises a right plunger, the left door portion of the left sidewall defines a left receptacle, the right door portion of the right sidewall defines a right receptacle, and wherein the left receptacle and the right receptacle are configured to selectively receive the left plunger and the right plunger, respectively, when the left door portion and the right door portion are in respective opened positions with the first floor portion in the upright position.

16. The utility bed of claim 15 further comprising a left selector operably coupled with the left plunger and a right selector operably coupled with the right plunger.

17. A vehicle comprising:

a vehicular frame; and a utility bed associated with the vehicular frame and comprising:

a bed frame;

a bed floor associated with the bed frame and including a first floor portion and a second floor portion, the first floor portion being pivotally coupled with the second floor portion and pivotable between an upright position and a cargo support position;

a left sidewall comprising a left door portion and a left wall portion, the left door portion being pivotable between an opened position and a closed position;

a right sidewall comprising a right door portion and a right wall portion, the right door portion being pivotable between an opened position and a closed position;

a left locking mechanism coupled with the left wall portion; and a right locking mechanism coupled with the right wall portion;

wherein when the left door portion and the right door portion are in respective opened positions, the left locking mechanism and the right locking mechanism are configured to selectively engage the left door portion and the right door portion, respectively, to retain the first floor portion of the bed floor in the upright position.

18. The vehicle of claim 17 wherein the utility bed is pivotally coupled with the vehicular frame and is pivotable between a hauling position and a dumping position.

* * * * *

UNITED STATES PATENT AND TRADEMARK OFFICE
CERTIFICATE OF CORRECTION

PATENT NO. : 8,313,133 B2  Page 1 of 1
APPLICATION NO. : 12/697421
DATED : November 20, 2012
INVENTOR(S) : Darin D. King It is certified that error appears in the above-identified patent and that said Letters Patent is hereby corrected as shown below:

Column 6, line 58, change "selectors." to --selectors--;
Column 9, line 38, change "be," to --be--;
Claim 1, column 10, line 19, change "with first" to --with the first--; and
Claim 9, column 11, lines 13-14, change "sidewall," to --sidewall;--.

Signed and Sealed this
Nineteenth Day of March, 2013

Teresa Stanek Rea
*Acting Director of the United States Patent and Trademark Office*